(12) United States Patent
Hyman et al.

(10) Patent No.: US 9,489,383 B2
(45) Date of Patent: Nov. 8, 2016

(54) RELEVANT CONTENT TO ENHANCE A STREAMING MEDIA EXPERIENCE

(75) Inventors: David Hyman, Kensington, CA (US); Andrei M. Marinescu, San Francisco, CA (US)

(73) Assignee: BEATS MUSIC, LLC, San Francisco, CA (US)

( * ) Notice: Subject to any disclaimer, the term of this patent is extended or adjusted under 35 U.S.C. 154(b) by 1351 days.

(21) Appl. No.: 12/105,294

(22) Filed: Apr. 18, 2008

(65) Prior Publication Data

US 2009/0265213 A1 Oct. 22, 2009

(51) Int. Cl.
*G06F 21/00* (2013.01)
*G06F 17/30* (2006.01)

(52) U.S. Cl.
CPC ............... *G06F 17/30035* (2013.01)

(58) Field of Classification Search
CPC ........................................ G06F 21/10
See application file for complete search history.

(56) References Cited

U.S. PATENT DOCUMENTS

| | | | |
|---|---|---|---|
| 5,616,876 A | 4/1997 | Cluts | |
| 6,526,411 B1 | 2/2003 | Ward | |
| 7,827,110 B1 | 11/2010 | Wieder | |
| 7,884,274 B1 | 2/2011 | Wieder | |
| 8,001,612 B1 | 8/2011 | Wieder | |
| 8,180,770 B2 | 5/2012 | Ranasinghe et al. | |
| 2002/0078029 A1 | 6/2002 | Pachet | |
| 2002/0091848 A1 | 7/2002 | Agresta et al. | |
| 2002/0099731 A1* | 7/2002 | Abajian ............. | G06F 17/3002 715/202 |
| 2002/0120564 A1 | 8/2002 | Strietzel | |
| 2002/0138630 A1 | 9/2002 | Solomon et al. | |
| 2002/0152278 A1 | 10/2002 | Pontenzone et al. | |
| 2002/0157034 A1 | 10/2002 | Sagar | |
| 2002/0198909 A1 | 12/2002 | Huynh et al. | |
| 2003/0005138 A1 | 1/2003 | Giffin et al. | |
| 2003/0221541 A1 | 12/2003 | Platt | |
| 2004/0002310 A1 | 1/2004 | Herley et al. | |
| 2004/0100479 A1 | 5/2004 | Nakano et al. | |
| 2004/0158860 A1 | 8/2004 | Crow | |
| 2004/0165006 A1 | 8/2004 | Kirby et al. | |

(Continued)

FOREIGN PATENT DOCUMENTS

JP 2004048557 A * 2/2004 ............. H04N 7/173

OTHER PUBLICATIONS

Griffin, Introducing the Slider control, May 17, 2007, accessed Feb. 8, 2012.

(Continued)

*Primary Examiner* — James A Reagan
(74) *Attorney, Agent, or Firm* — Polsinelli PC

(57) ABSTRACT

A method, system and apparatus of relevant content to enhance a streaming media experience are disclosed. In one embodiment, a method includes selecting a media content from a content database having content of a plurality of artists and media labels based on a request of a user of a social community environment, automatically selecting a relevant content related to the media content from at least one of a user generated content library and a professional content library based on match between a meta-data associated with the media content and the relevant content, streaming the media content from a central server associated with the central content database to the user without requiring consideration of the user to access the media content, and displaying the relevant content to the user when the media content is being streamed.

28 Claims, 8 Drawing Sheets

(56) References Cited

U.S. PATENT DOCUMENTS

| | | |
|---|---|---|
| 2004/0175159 A1 | 9/2004 | Oetzel et al. |
| 2006/0031776 A1 | 2/2006 | Glein et al. |
| 2006/0156236 A1 | 7/2006 | Heller et al. |
| 2006/0168340 A1 | 7/2006 | Heller et al. |
| 2006/0195512 A1 | 8/2006 | Rogers et al. |
| 2006/0195521 A1 | 8/2006 | New et al. |
| 2006/0265421 A1 | 11/2006 | Ranasinghe et al. |
| 2007/0168388 A1 | 7/2007 | Plastina et al. |
| 2007/0174866 A1 | 7/2007 | Brown et al. |
| 2007/0220575 A1* | 9/2007 | Cooper ............... H04N 7/1675 725/118 |
| 2007/0250445 A1 | 10/2007 | Ache |
| 2007/0250901 A1* | 10/2007 | McIntire ........... H04N 7/17318 725/146 |
| 2008/0092182 A1 | 4/2008 | Conant |
| 2008/0120308 A1 | 5/2008 | Martinez et al. |
| 2008/0120501 A1 | 5/2008 | Jannink et al. |
| 2008/0126930 A1 | 5/2008 | Scott |
| 2008/0140849 A1 | 6/2008 | Collazo |
| 2008/0162147 A1 | 7/2008 | Bauer |
| 2008/0189318 A1 | 8/2008 | Bourke et al. |
| 2008/0194276 A1 | 8/2008 | Lin et al. |
| 2008/0195468 A1* | 8/2008 | Malik ................... G06Q 30/02 705/14.53 |
| 2008/0207182 A1 | 8/2008 | Maharajh et al. |
| 2008/0270532 A1 | 10/2008 | Billmaier et al. |
| 2009/0055426 A1 | 2/2009 | Kalasapur et al. |
| 2009/0063991 A1* | 3/2009 | Baron ................ H04L 12/1822 715/751 |
| 2009/0089162 A1 | 4/2009 | Davis et al. |
| 2009/0117845 A1 | 5/2009 | Rao |
| 2009/0144325 A1 | 6/2009 | Chastagnol et al. |
| 2009/0177967 A1 | 7/2009 | Moore et al. |
| 2009/0217804 A1 | 9/2009 | Lu et al. |
| 2009/0234888 A1 | 9/2009 | Holmes et al. |
| 2010/0094820 A1 | 4/2010 | Purdy |
| 2010/0251305 A1 | 9/2010 | Kimble et al. |
| 2010/0280906 A1 | 11/2010 | Lim et al. |
| 2010/0318928 A1 | 12/2010 | Neuman et al. |
| 2010/0321519 A1 | 12/2010 | Bill |
| 2011/0078323 A1 | 3/2011 | Wooden |
| 2011/0153638 A1 | 6/2011 | McLean |
| 2011/0154198 A1 | 6/2011 | Bachman et al. |
| 2011/0154394 A1 | 6/2011 | Brodersen et al. |
| 2011/0199180 A1 | 8/2011 | Holman |
| 2011/0295843 A1 | 12/2011 | Ingrassia, Jr. et al. |
| 2012/0022967 A1 | 1/2012 | Bachman et al. |
| 2012/0078396 A1 | 3/2012 | Case, Jr. et al. |
| 2012/0109345 A1 | 5/2012 | Gilliland |
| 2012/0331386 A1 | 12/2012 | Hicken et al. |
| 2013/0006627 A1 | 1/2013 | Guthery et al. |
| 2013/0018897 A1 | 1/2013 | Martinez et al. |
| 2013/0073280 A1 | 3/2013 | O'Neil et al. |
| 2013/0191454 A1 | 7/2013 | Oliver et al. |
| 2014/0115463 A1 | 4/2014 | Reznor et al. |

OTHER PUBLICATIONS

Kum et al., Metadata Retrieval Using RTCP for Multimedia Streaming, 2008.

\* cited by examiner

| USER 402 | STREAMING SONG 404 | PLAYLISTS 406 | TARGET CONTENT 408 | INTERESTS 410 | OTHER 412 |
|---|---|---|---|---|---|
| BILL | U2 | 3 PLAYLIST | BLOGS | GOLF, BIKING | MY FAVORITE: RHYTHM DIVINE |
| JANE | MICHAEL JACKSON | 2 PLAYLIST | FORUMS | PIZZA, FOOD, HIP HOP | CRAZE ABOUT "FATBOY" SONG |
| • | • | • | • | • | • |
| • | • | • | • | • | • |
| • | • | • | • | • | • |

TABLE VIEW 450

US 9,489,383 B2

RELEVANT CONTENT TO ENHANCE A STREAMING MEDIA EXPERIENCE

FIELD OF TECHNOLOGY

This disclosure relates generally to the technical field of communications and, in one example embodiment, to a method, apparatus, and system of relevant content to enhance a streaming media experience.

BACKGROUND

A social community environment (e.g., Facebook©, imeem©, MOG© etc.) may stream a media content (e.g., a song, a movie, etc.) to a user (e.g., a music fan, a movie patron, a computer gaming patron, an e-book reader, etc.). The social community environment may collect information from a variety of sources. For example, the social community environment may have profile pages in users express things that they like and do not like. Furthermore, the social community environment may aggregate information from a variety of sources (e.g., professional, user analytics, user-generated, etc.). However, an experience of the user when the media content is streamed to the user may be limited to just the media content being streamed.

SUMMARY

A method, system and apparatus of relevant content to enhance a streaming media experience is disclosed. In one aspect, a method includes selecting a media content from a content database having content of a plurality of artists and media labels based on a request of a user of a social community environment, automatically selecting a relevant content related to the media content from at least one of a user generated content library (e.g., may include a blog content, a karaoke performance, a discussion content, a chat content, and/or an indicator that illustrates which other users may be concurrently listening to the media content) and a professional content library (e.g., may include a news content, an event content, a background information content, a lyrics content, and/or a performance content) based on match between a meta-data (e.g., may include an artist name, a track name, an album name, a genre, a theme, etc.) associated with the media content and the relevant content, streaming the media content from a central server associated with the central content database to the user without requiring consideration of the user to access the media content, and displaying the relevant content to the user when the media content is being streamed.

An electronic message may be sent to the user after the media content is streamed having additional relevant content related to the media content. The relevant content may be determined based on a profile of the user in the social community environment. The method may include providing a bidding system in which different organizations providing relevant content bid against each other on placement and/or click through of the relevant content in a specific ones of the media content of the artists and at specific locations of the media content of the artists. The different organizations may select different profiles of users of the social community environment to target delivery of the relevant content. The method may also include determining the relevant content that may be displayed based on an analysis of a click through rate on the relevant content by users of the social community environment.

The relevant content may be displayed in a drop-down banner adjacent to a location in the social community environment in which the user selected the media content. The method may include providing a server-side media player associated with the social community environment that enables the user to stream the media content along with the relevant content to a client device. The method may also include providing a widget of the server-side media player that may be embeddable across different websites (e.g., users of the different websites may able to stream the media content along with the relevant content to their respective client devices from the central server through the different websites).

The method may include processing a transaction in which the user purchases a downloadable copy of the media content. The method may also include communicating the downloadable copy of the media content to the client device when the transaction is complete. The method may include selecting a different relevant content to be displayed after the relevant content when the media content is still being streamed to the client device (e.g., the different ones of the relevant content may be targeted toward a beginning portion, an middle portion, an ending portion, and/or an arbitrary portion of the streaming of the media content).

In another aspect, a method includes generating a relevant content that is targeted toward a user playing a streaming media content from a central server based on a characteristic of a media content currently being streamed and a meta-data (e.g., may be an artist name, a track name, an album name, a genre, and/or a theme) of the relevant content, and displaying the relevant content while the media content is streamed to a client device associated with the user.

The relevant content may be selected from a user generated content library and/or a professional content library. The user generated content library may include a blog content, a karaoke performance, a discussion content, a chat content, and/or an indicator that illustrates other users may be concurrently listening to the media content. The professional content library may include a news content, an event content, a background information content, a lyrics content, and/or a performance content. An electronic message may be sent to the user after the media content is streamed having additional relevant content related to the media content. The relevant content may be determined based on a profile of the user in a social community environment.

In yet another aspect, a system includes a central server to stream a media content to a user and to select a relevant content to be simultaneously displayed with the media content being streamed, a media database associated with the central server having the media content and other media content of a plurality of artists and media labels based on a request of a user of a social community environment, a related content database associated with the central server having a user generated content library (e.g., may include a blog content, a karaoke performance, a discussion content, a chat content, and/or an indicator that illustrates which other users may be concurrently listening to the media content) and a professional content library (e.g., may include a news content, an event content, a background information content, a lyrics content, and/or a performance content) associated with each of the media content of the media database, and a client device to display the relevant content to the user when the media content is streamed to the user without requiring consideration from the user to access the media content.

The system may include a communication module of the central server may transmit an electric message to the user after the media content is streamed having additional relevant content related to the media content.

The methods, system, and apparatuses disclosed herein may be implemented in any means for achieving various aspects, and may be executed in a form of machine-readable medium embodying a set of instruction that, when that, when executed by a machine, causes the machine to perform any of the operation disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
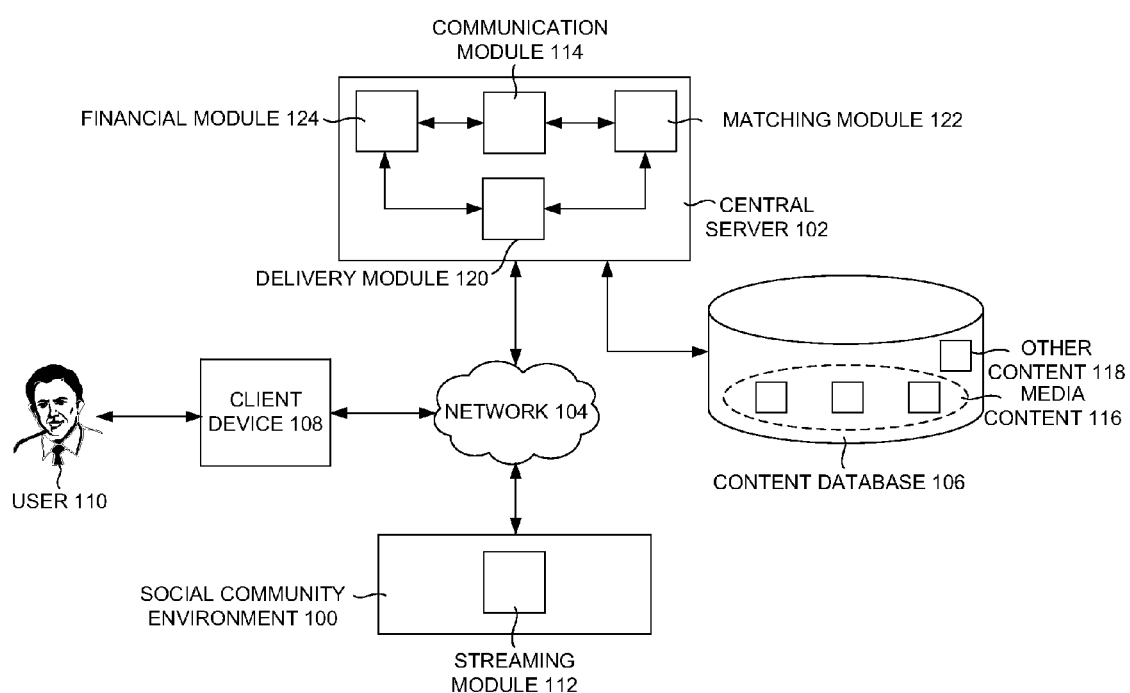
FIG. 1 is system view of a user selecting the media data of his/her interest through a client device through a network, according to one embodiment.

Other features of the present embodiments will be apparent from the accompanying drawings and from the detailed description that follows.

DETAILED DESCRIPTION

A method, apparatus and system of relevant content to enhance a streaming media experience are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes selecting a media content (e.g., the media content 116 of FIG. 1) from a content database (e.g., the content database 106 of FIG. 1) having content of artists and media labels based on a request of a user (e.g., the user 110 of FIG. 1) of a social community environment (e.g., the social community environment 100 of FIG. 1), automatically selecting a relevant content related to the media content 116 (e.g., using the relevant content module 200 of FIG. 2) from a user generated content library (e.g., the user generated content library 216 of FIG. 2) and a professional content library (e.g., the professional content library 218 of FIG. 2) based on match between a meta-data associated with the media content 116 and the relevant content (e.g., using the matching module 122 of FIG. 1), streaming the media content 116 from a central server (e.g., the central server 102 of FIG. 1) associated with the central content database to the user 110 without requiring consideration of the user 110 to access the media content 116 (e.g., using the streaming module 112 of FIG. 1), and displaying the relevant content to the user 110 when the media content 116 is being streamed.

In another embodiment, a method includes generating a relevant content that is targeted (e.g., using the targeting module 202 of FIG. 2) toward a user (e.g., the user 110 of FIG. 1) playing a streaming media content from a central server (e.g., the central server 102 of FIG. 1) based on a characteristic of a media content (e.g., the media content 116 of FIG. 1) currently being streamed and a meta-data of the relevant content, and displaying the relevant content while the media content 116 is streamed to a client device (e.g., the client device 108 of FIG. 1) associated with the user 110.

In yet another embodiment, a system includes a central server (e.g., the central server 102 of FIG. 1) to stream a media content (e.g., the media content 116 of FIG. 1) to a user (e.g., the user 110 of FIG. 1) and to select a relevant content (e.g., using the targeting module 202 of FIG. 2) to be simultaneously displayed with the media content 116 being streamed (e.g., using the streaming module 112 of FIG. 1), a media database associated with the central server 102 having the media content 116 and other media content (e.g., the other media content 118 of FIG. 1) of artists and media labels based on a request of a user (e.g., the user 110 of FIG. 1) of a social community environment (e.g., the social community environment 100 of FIG. 1), a related content database (e.g., the relevant content database 214 of FIG. 2) associated with the central server 102 having a user generated content library (e.g., the user generated content library 216 of FIG. 2) and a professional content library (e.g., the professional content library 218 of FIG. 2) associated with each of the media content 116 of the media database, and a client device (e.g., the client device 108 of FIG. 1) to display the relevant content to the user 110 (e.g., using the relevant content module 200 of FIG. 2) when the media content 116 is streamed to the user 110 without requiring consideration from the user 110 to access the media content 116.

FIG. 1 is system view of a user (e.g., the user 110 of FIG. 1) selecting the media data of his/her interest through a client device (e.g., the client device 108 of FIG. 1) through a network (e.g., the network 104 of FIG. 1), according to one embodiment. Particularly, FIG. 1 illustrates a social community environment 100, a central server 102, a network 104, a content database 106, a client device 108, a user 110, a streaming module 112, a communication module 114, media content 116, other media content 118, a delivery module 120, a matching module 122, and a financial module 124, according to one embodiment.

The social community environment 100 may be a community in which users share their interests (e.g., common interest in music, videos, etc.) with other users having similar or different interests online. The central server 102 may be an application and/or device that may perform services to the client devices. The central server 102 may be a set of computers that may store applications and/or data files shared by many different people on the network 104 (e.g., an internet, etc.). The network 104 may be a local area network, a wide area network, an internet network etc. where the user 110 may communicate with the central server 102 through the social community environment 100 (e.g., using the communication module 114 of FIG. 1) for the media content 116 of his/her interest.

The content database 106 may be collection of content data which may include media data (e.g., audio data, video data, etc.). The client device 108 may be data processing system (e.g., computer, laptop, mobile, etc.). The user 110 may be person, patron etc who may want to access the media data of their interest. The streaming module 112 may stream media data (e.g., audio data, video data, etc.) to the client device 108. The communication module 114 of the streaming module 112 may provide communication with the central server 102 through the network 104. The media content 116 may be audio, video, etc. stored in the content database 106. The other media content 118 may include media data such as artists, media labels, etc. The delivery module 120 may transmit the requested media data (e.g., song, movie, etc.) when transaction associated with requested media data is completed. The matching module 122 may match relevant content (e.g., may be good and/or service, etc.) with the requested media data (e.g., artist, album, a track etc.), with the interests etc. associated with the user 110 (e.g., the person interested in media data). The financial module 124 may manage transaction associated with media data, relevant data, etc.

In example embodiment, the user 110 may select the interested media content in the client device 108 through the network 104. The media data may be streamed to the user 110 by communicating with the central server 102 when the user 110 requests the media data through the social community environment 100. The central server 102 may communicate with the content database 106 to stream the media data through the social community environment 100.

In one embodiment, the media content 116 may be selected from a content database (e.g., the content database 106 of FIG. 1) having content of artists and media labels based on a request of the user 110 of the social community environment 100. A relevant content may be selected automatically related to the media content 116 (e.g., using the relevant content module 200 of FIG. 2) from the user generated content library 216 and the professional content library 218 based on match between a meta-data associated with the media content 116 and the relevant content. The media content 116 may be streamed (e.g., using the streaming module 112 of FIG. 1) from a central server (e.g., the central server 102 of FIG. 1) associated with the central content database to the user 110 without requiring consideration of the user 110 to access the media content 166. The relevant content may be displayed to the user 110 when the media content 116 is being streamed.

An electronic message may be sent to the user 110 (e.g., using the messaging module 208 of FIG. 2) after the media content 116 is streamed (e.g., using the streaming module 112 of FIG. 1) having additional relevant content related to the media content 116. The relevant content based on a profile of the user 110 may be determined in the social community environment 100 (e.g., using the matching module 122 of FIG. 1). A relevant content that may be targeted (e.g., using the targeting module 202 of FIG. 2) toward the user 110 playing a streaming media content (e.g., using the streaming module 112 of FIG. 1) may be generated from a central server (e.g., the central server 102 of FIG. 1) based on a characteristic of the media content 116 currently being streamed and/or a meta-data of the relevant content (e.g., using the matching module 122 of FIG. 1). The relevant content may be displayed while the media content 116 may be streamed to a client device (e.g., the client device 108 of FIG. 1) associated with the user 110.

The central server 102 may stream a media content 116 (e.g., using the streaming module 112 of FIG. 1) to the user 110 and to select a relevant content (e.g., from the relevant content module 200 of FIG. 2) to be simultaneously displayed with the media content 116 being streamed. A media database associated with the central server 102 may have the media content 116 and other media content of artists and/or media labels based on a request of the user 110 of the social community environment 100. A related content database associated with the central server 102 may have a user generated content library 216 and the professional content library 218 associated with each of the media content 116 of the media database. The client device 108 may display the relevant content to the user 110 when the media content 116 may be streamed to the user 110 (e.g., using the streaming module 112 of FIG. 1) without requiring consideration from the user 110 to access the media content 116.

Figure 2:
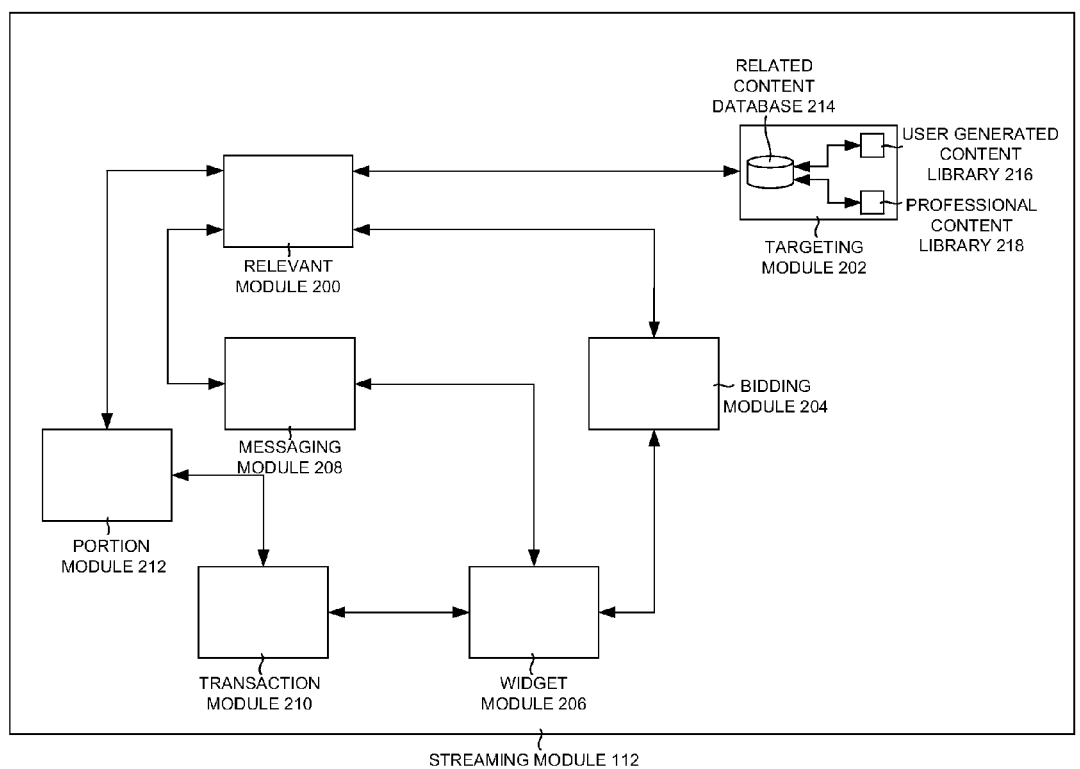
FIG. 2 is an exploded view of streaming module illustrated in FIG. 1, according to one embodiment.

The communication module 114 of the central server 102 may transmit an electronic message to the user 110 (e.g., using the messaging module 208 of FIG. 2) after the media content 116 may be streamed having additional relevant content related to the media content 116 (e.g., using the relevant content module 200 of FIG. 2).

FIG. 2 is an exploded view of streaming module 112 illustrated in FIG. 1, according to one embodiment. Particularly, FIG. 2 illustrates a streaming module 112, a relevant content module 200, a targeting module 202, a bidding module 204, a widget module 206, a messaging module 208, a transaction module 210, a portion module 212, a relevant content database 214, a user generated content library 216, and a professional content library 218, according to one embodiment.

The relevant content module 200 may stream the relevant content matching (e.g., using the matching module 122 of FIG. 1) with the media content 116 the user 110 had requested. The targeting module 202 may target relevant content related to the media content 116, interests, etc. associated to a particular user who requests for the media content 116. The bidding module 204 may enable entities/organizations to bid against each other on placement and click. The widget module 206 may enable placement of widgets of server-side media player 350 in other websites. The messaging module 208 may send a message to the user 110 after the media content 116 may streamed and/or relevant content are displayed. The transaction module 210 may enable the transaction between the user 110, the organizations providing relevant content, the social community environment 100 and/or the central server 102.

The portion module 212 may enable the streaming module 112 to stream the relevant content 300 during beginning portion, middle portion, end portion, and/or arbitrary portion of the streaming media content. The portion module 212 may also enable allocating a portion of revenue to the organizations participating in bid. The relevant content database 214 may include different contents that may be displayed based on matching meta-data, the user generated content library 216, and the professional content library 218 etc, and based/or on the interest of the user 110. The user generated content library 216 may be a collection of various contents such as the blog content, etc. The professional content library 218 may be a collection of the news content, etc.

In an example embodiment, the relevant content module 200 may communicate with the targeting module 202 for streaming the relevant content 300 in the relevant content database 214 using the user generated content library 216, and/or the professional content library 218. The relevant content module 200 may communicate with the bidding module 204, the messaging module 208, and/or the portion module 212 directly and/or with transaction module 210 and the widget module 206.

In one embodiment, the user generated content library 216 may include a blog content, a karaoke performance, a discussion content, a chat content, and/or an indicator that may illustrates which other users may be concurrently listening to the media content 116. The professional content library 218 may include a news content, an event content, a background information content, a lyrics content, and/or a performance content. The meta-data may be an artist name, a track name, an album name, a genre, and/or a theme. The bidding system may be provided (e.g., using the bidding module 204 of FIG. 2) in which different organizations providing relevant content bid (e.g., using the relevant content module 200 of FIG. 2) against each other on placement and/or click through of the relevant content in a specific ones of the media content 116 of the artists and/or at specific locations of the media content 116 of the artists, and in which the different organizations may select different profiles of users of the social community environment 100 to target delivery of the relevant content (e.g., using the delivery module 120 of FIG. 1).

It may be determined that the relevant content that may be displayed (e.g., using the relevant content module 200 of FIG. 2) based on an analysis of a click through rate on the relevant content by users of the social community environment 100. A different relevant content to be displayed may be selected after the relevant content when the media content 116 may be still being streamed to the client device (e.g., using the streaming module 112 of FIG. 1) such that the different ones of the relevant content may be targeted towards a beginning portion, an middle portion, an ending portion, and/or an arbitrary portion of the streaming of the media content (e.g., using the portion module 212 of FIG. 2).

The relevant content may be selected (e.g., using the relevant content module 200 of FIG. 2) from the user generated content library 216 and/or a professional content library 218. The user generated content library 216 may include a blog content, a karaoke performance, a discussion content, a chat content, and/or an indicator that may illustrates which other users may be concurrently listening to the media content 116. The professional content library 218 may include a news content, an event content, a background information content, a lyrics content, and/or a performance content.

The meta-data may be an artist name, a track name, an album name, a genre, and/or a theme. A widget of the server-side media player 350 that may be embeddable (e.g., using the widget module 206 of FIG. 2) may be provided across different websites (e.g., users of the different websites may be able to stream the media content 116 along with the relevant content to their respective client devices from the central server 102 through the different websites).

A transaction may be processed (e.g., using the transaction module 210 of FIG. 2) in which the user 110 may purchase a downloadable copy of the media content 116. The downloadable copy of the media content 116 may be communicated to the client device 108 (e.g., using the transaction module 210 of FIG. 2) when the transaction is complete.

Figure 3:
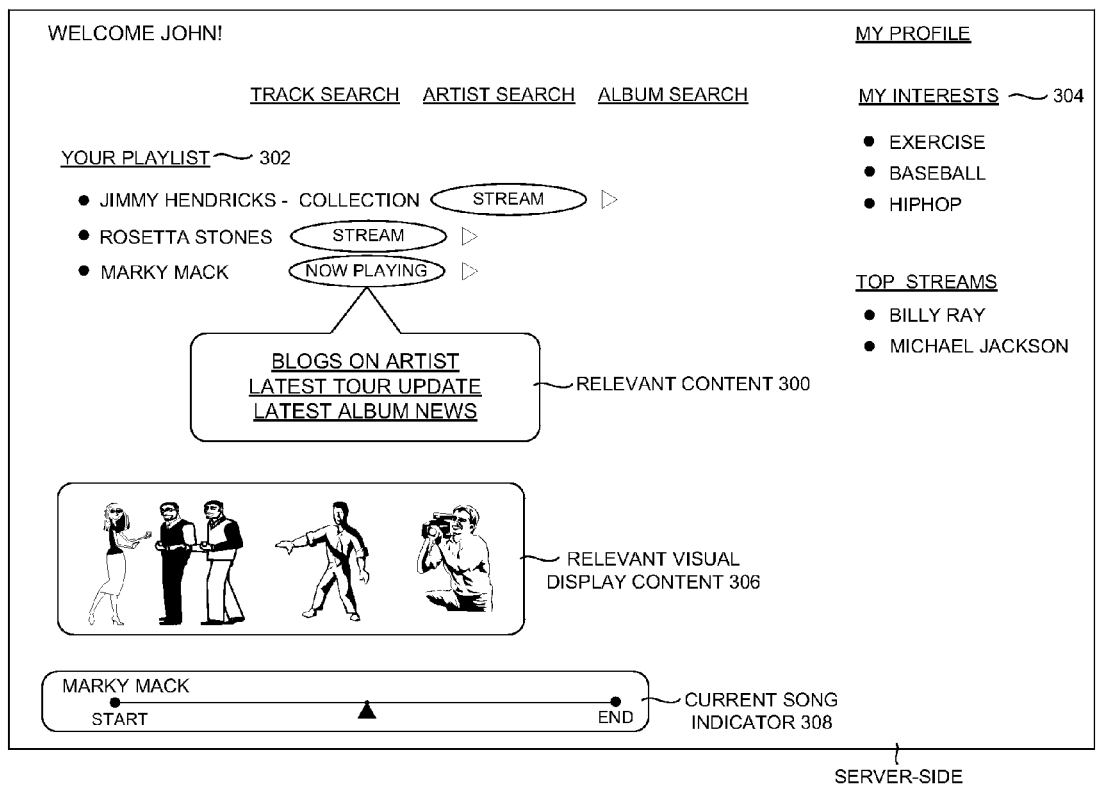
FIG. 3 is a user interface view of server-side media player, according to one embodiment.

FIG. 3 is a user interface view of server-side media player 350, according to one embodiment. Particularly, FIG. 3 illustrates a relevant content 300, your play list 302, my interests 304, relevant visual display content 306, and a current song indicator 308, according to one embodiment.

The relevant content 300 associated with the user profile, the user's media data of interest, etc. may be displayed in the server-side media player 350. The relevant content 300 may be created by the user generated content library 216 and/or the professional content library 218. The "your play list" 302 may be a list of media data that the user 110 may have created. The "my interests" 304 may be the interests specified by the user 110 in the profile. The relevant visual display content 306 may be content which is visual (e.g., relevant video data, etc.) associated with the media content 116. The current song indicator 308 may indicate the song currently being played along with the timing status of the song. The server-side media player 350 may be a server side application for playing the media content 116 on different websites.

In example embodiment, the user interface view may display the server-side media player 350 which may show John's profile along with the current song (e.g., Marky Mack) being played. The user profile (e.g., John's profile) may include the playlists (e.g., the "your playlists" 302 of FIG. 3), the user interests (e.g., my interests 304 of FIG. 3), top streams, the relevant content 300, the relevant visual display content 306, the current song indicator 308, etc. The "your playlist" 302 may display Jimmy Hendrickws, Rosetta Stones, Marky Mack. The "my interest" 304 may display exercise, base ball, hiphop, etc. The relevant content 300 may display blogs on artist, latest album news, Marky's tour update, etc related to the current playing track.

In one embodiment, the server-side media player 350 may be provided associated with the social community environment 100 that may enable the user 110 to stream the media content 116 along with the relevant content to the client device 108. The relevant content may be displayed in a drop-down banner adjacent to a location in the social community environment 100 in which the user 110 selected the media content 116.

Figure 4:
FIG. 4 is a table view illustrating various fields such as streaming data, playlist, target content, etc., according to one embodiment.

FIG. 4 is a table view 450 of illustrating various fields such as streaming data, playlist, target content, etc., according to one embodiment. Particularly, FIG. 4 illustrates a user field 402, a streaming song field 404, a play list filed 406, a target content field 408, interests field 410, and other field 412, according to one embodiment.

The user field 402 may illustrate the user 110 (e.g., Bill, Jane, as illustrated in FIG. 4) who is streaming the media data from the network 104. The streaming song field 404 may illustrate the song that is currently being streamed by the particular user. The play list filed 406 may state the number of playlists the user 110 is currently having. The target content field 408 may display the relevant content related to the song, interest of particular user, etc. that may be streamed along with the streaming song. The interests field 410 may display the interests of the particular user. The other field 412 may display other aspects (e.g., favorites, craze, etc.) associated with particular user.

In an example embodiment, the FIG. 4 illustrates various fields according to one embodiment. The user field 402 column may display Bill in first row and Jane in second row. The streaming song field 404 column may display U2 in first row associated with user Bill and Michael Jackson's song streamed associated with user Jane in second row. The playlist 406 column may display three playlists and two playlists associated with the users Bill and Jane respectively. The target content field 408 column may display blogs to the user Bill associated with his/her streaming song U2, interests of Bill etc. on the first row and forums to the user Jane associated with her streaming song of Michael Jackson, interests of Jane etc. The interests field 410 may display interests such as Golf, Biking associated with the user Bill and interests such as Pizza, Food, Hip hop etc. associated with the user Jane. The other filed 412 may display "rhythm divine" as favorite of Bill, craze on song as "Fatboy" for Jane, according to one embodiment.

Figure 5:
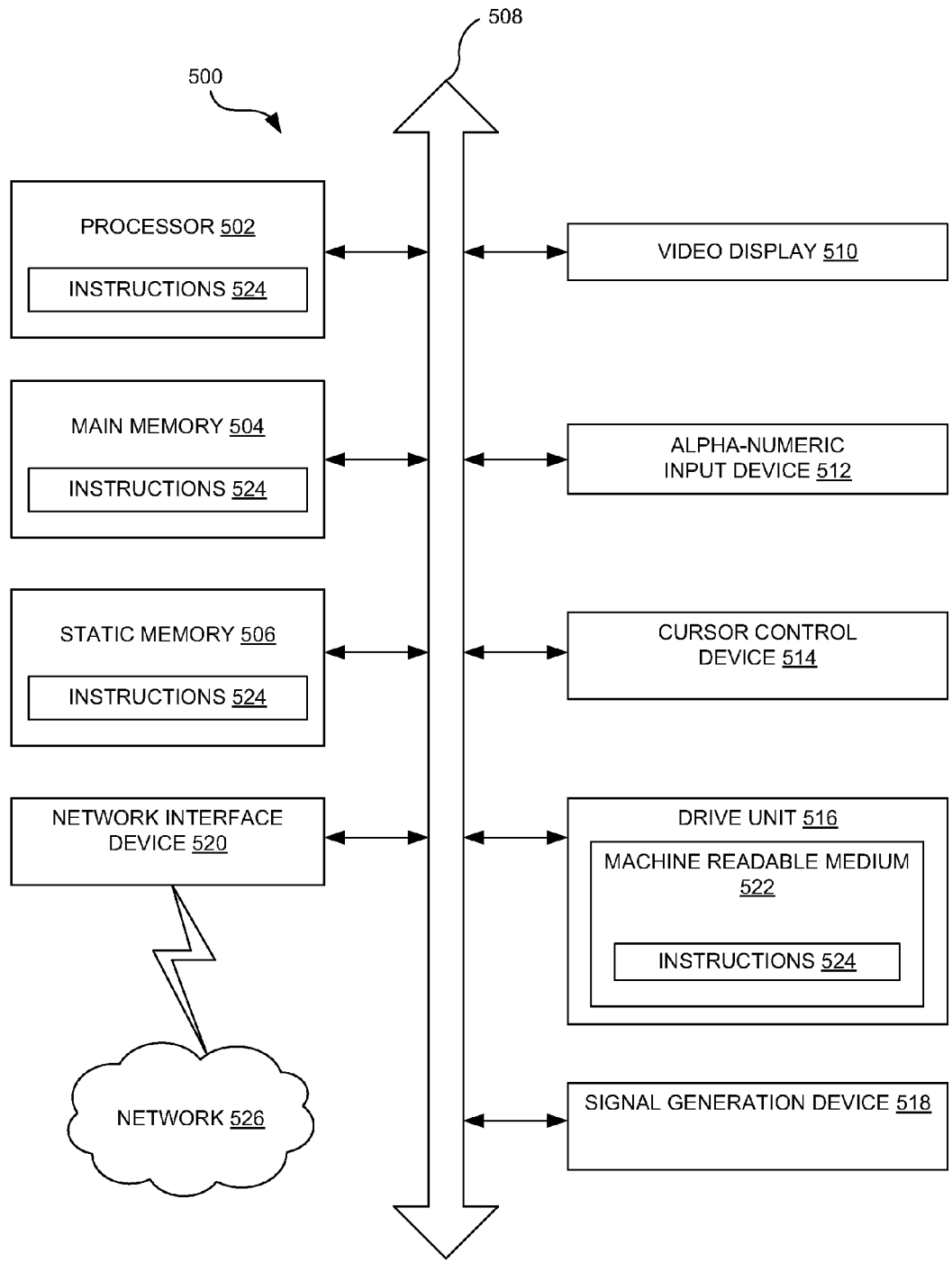
FIG. 5 is a diagrammatic system view of a data processing system in which any of the embodiments disclosed herein may be performed, according to one embodiment, according to one embodiment.

FIG. 5 is a diagrammatic system view 500 of a data processing system in which any of the embodiments disclosed herein may be performed, according to on embodiment. Particularly, the diagrammatic system view 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or the data processing system in which one or more operations disclosed herein are performed. The processor 502 may be a microprocessor, a state machine, an application specific integrated circuit, a field programmable gate array, etc. (e.g., Intel® Pentium® processor). The main memory 504 may be a dynamic random access memory and/or a primary memory of a computer system.

The static memory 506 may be a hard drive, a flash drive, and/or other memory information associated with the data processing system. The bus 508 may be an interconnection between various circuits and/or structures of the data processing system. The video display 510 may provide graphical representation of information on the data processing system. The alpha-numeric input device 512 may be a keypad, a keyboard and/or any other input device of text (e.g., a special device to aid the physically handicapped).

The cursor control device 514 may be a pointing device such as a mouse. The drive unit 516 may be the hard drive, a storage system, and/or other longer term storage subsystem. The signal generation device 518 may be a bios and/or a functional operating system of the data processing system. The network interface device 520 may be a device that performs interface functions such as code conversion, protocol conversion and/or buffering required for communication to and from the network 526. The machine readable medium 522 may provide instructions on which any of the methods disclosed herein may be performed. The instructions 524 may provide source code and/or data code to the processor 502 to enable any one or more operations disclosed herein.

Figure 6A:
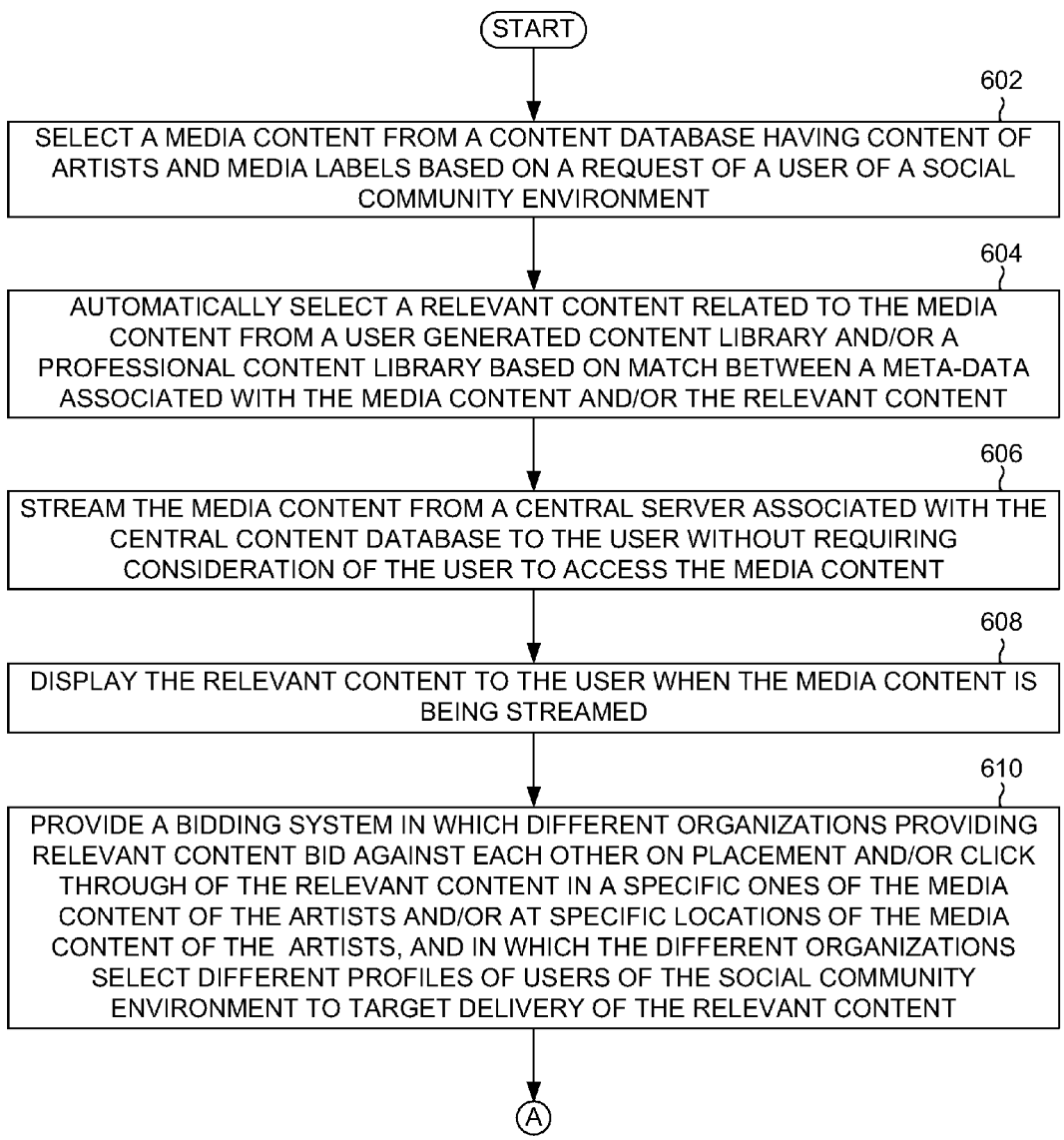
FIG. 6A is a process flow of selecting a media content from a content database based on a request of a user of a social community environment.

FIG. 6A is a process flow of selecting a media content (e.g., the media content 116 of FIG. 1) from a content database (e.g., the content database 106 of FIG. 1) based on a request of a user (e.g., the user 110 of FIG. 1) of a social community environment (e.g., the social community environment 100 of FIG. 1).

In operation 602, a media content (e.g., the media content 116 of FIG. 1) may be selected (e.g., using the relevant content module 200 of FIG. 2) from a content database (e.g., the content database 106 of FIG. 1) having content of artists and media labels based on a request of a user (e.g., the user 110 of FIG. 1) of a social community environment (e.g., the social community environment 100 of FIG. 1). In operation 604, a relevant content may be selected automatically related to the media content 116 (e.g., using the relevant content module 200 of FIG. 2) from a user generated content library (e.g., the user generated content library 216 of FIG. 2) and a professional content library (e.g., the professional content library 218 of FIG. 2) based on match between a meta-data associated with the media content 116 and the relevant content (e.g., as illustrated in relevant content database 214 of FIG. 2).

In operation 606, the media content 116 may be streamed (e.g., using the streaming module 112 of FIG. 1) from a central server (e.g., the central server 102 of FIG. 1) associated with the central content database to the user 110 without requiring consideration of the user 110 to access the media content 116. In operation 608, the relevant content may be displayed to the user 110 when the media content 116 is being streamed (e.g., using the streaming module 112 of FIG. 1). The user generated content library 216 may include a blog content, a karaoke performance, a discussion content, a chat content, and/or an indicator that illustrates which other users may be concurrently listening to the media content 116. The professional content library 218 may include a news content, an event content, a background information content, a lyrics content, and/or a performance content (e.g., using the relevant content module 200 of FIG. 2).

The meta-data may be an artist name, a track name, an album name, a genre, and/or a theme. An electronic message may be sent to the user 110 (e.g., using the messaging module 208 of FIG. 2) after the media content 116 is streamed having additional relevant content related to the media content 116 (e.g., using the streaming module 112 of FIG. 1). The relevant content may be determined based on a profile of the user 110 in the social community environment 100. In operation 610, a bidding system may be provided (e.g., using the bidding module 204 of FIG. 2) in which different organizations providing relevant content bid against each other on placement (e.g., using the relevant content module 200 of FIG. 2) and/or click through of the relevant content in a specific ones of the media content 116 of the artists and/or at specific locations of the media content 116 of the artists, and in which the different organizations select different profiles of users of the social community environment 100 to target delivery of the relevant content (e.g., using the delivery module 120 of FIG. 1).

Figure 6B:
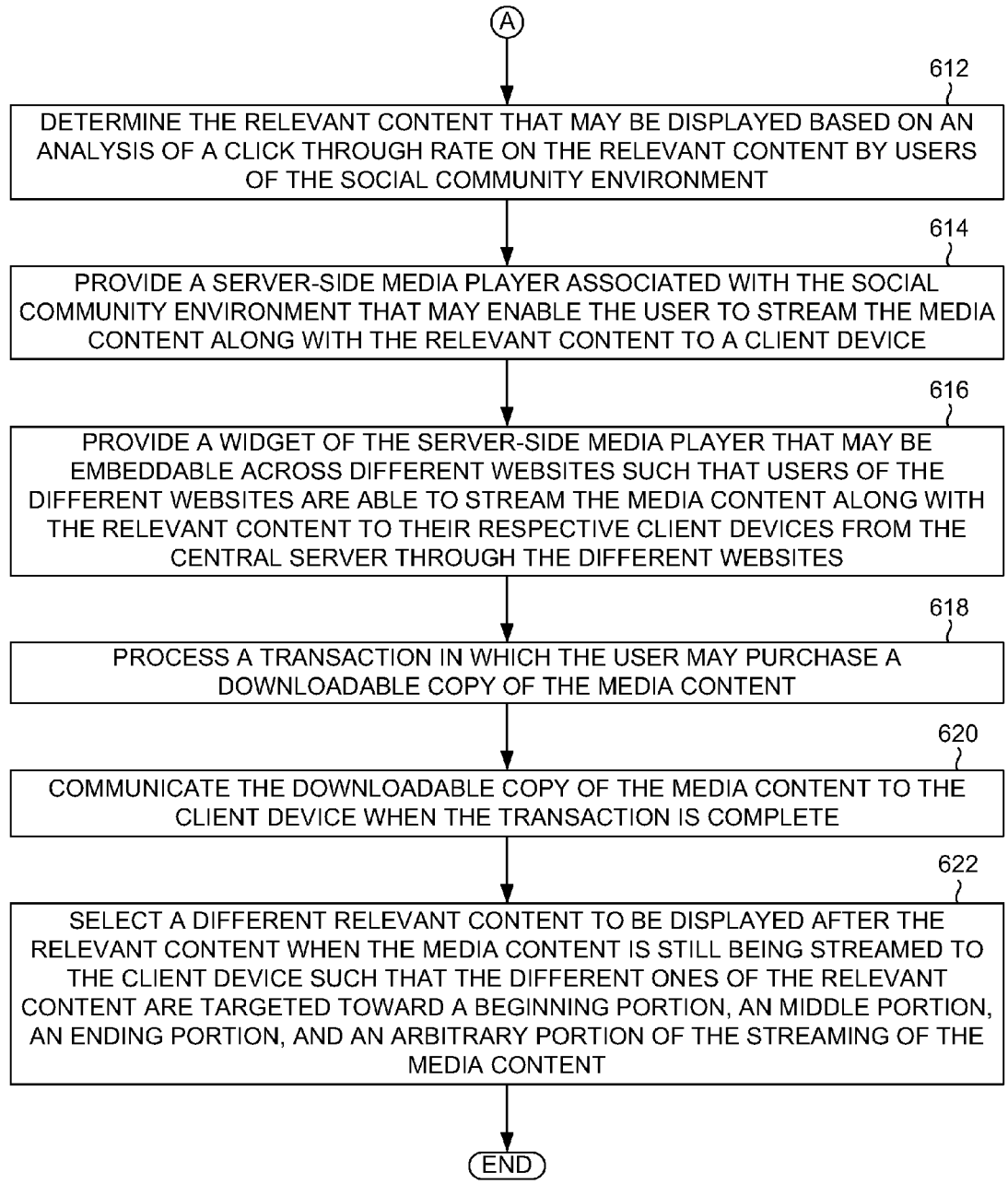
FIG. 6B is a continuation of process flow of FIG. 6A, illustrating additional operations, according to one embodiment.

FIG. 6B is a process flow of continuation of process flow of FIG. 6A, illustrating additional operations, according to one embodiment. In operation 612, it may be determined that the relevant content may be displayed based on an analysis of a click through rate on the relevant content by users of the social community environment 100 (e.g., using the relevant content module 200 of FIG. 2). The relevant content may be displayed (e.g., using the relevant content module 200 of FIG. 2) in a drop-down banner adjacent to a location in the social community environment 100 in which the user 110 selects the media content 116 (e.g., as illustrated in FIG. 1). In operation 614, a server-side media player (e.g., the server-side media player 350 of FIG. 3) may be provided associated with the social community environment 100 that enables the user 110 to stream the media content 116 along with the relevant content (e.g., using the streaming module 112 of FIG. 1) to a client device (e.g., the client device 108 of FIG. 1). In operation 616, a widget of the server-side media player 350 (e.g., using the widget module 206 of FIG. 2) may be provided that may be embeddable across different websites (e.g., such that the users of the different websites may able to stream the media content 116 along with the relevant content to their respective client devices from the central server 102 through the different websites).

In operation 618, a transaction may be processed (e.g., using the transaction module 210 of FIG. 2) in which the user 110 purchases a downloadable copy of the media content 116. In operation 620, the downloadable copy of the media content 116 may be communicated to the client device 108 (e.g., using the communication module 114 of FIG. 1) when the transaction may be complete (e.g., using the transaction module 210 of FIG. 2). In operation 622, a different relevant content may be selected to be displayed (e.g., using the relevant content module 200 of FIG. 2) after the relevant content when the media content 116 is still being streamed to the client device 108 (e.g., using the streaming module 112 of FIG. 1) such that the different ones of the relevant content may be targeted towards a beginning portion, an middle portion, an ending portion, and/or an arbitrary portion of the streaming of the media content 116 (e.g., using the portion module 212 of FIG. 2).

Figure 7:
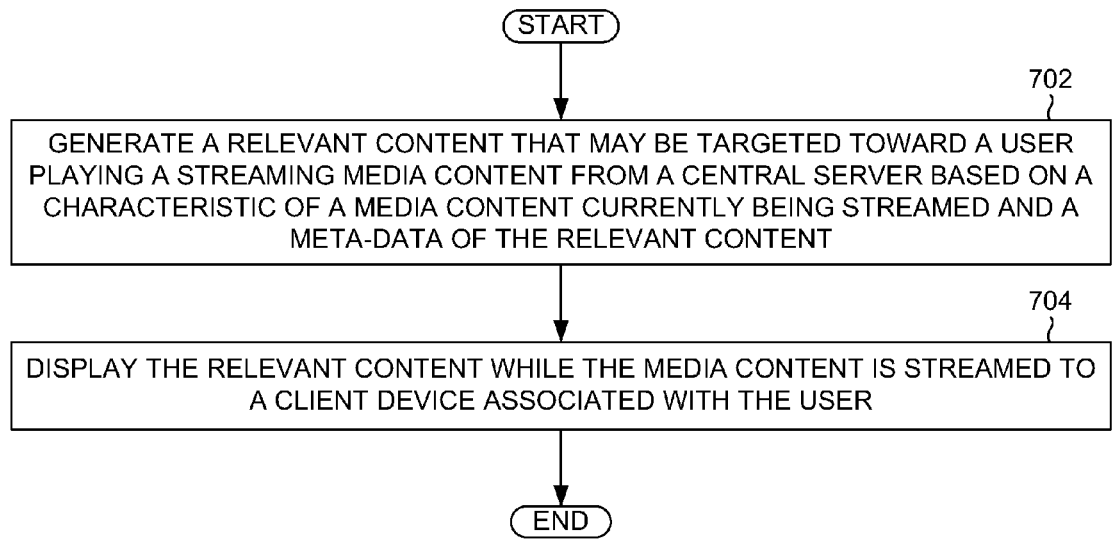
FIG. 7 is a process flow of generating and/or displaying the relevant content while the media content is streamed to a client device, according to one embodiment.

FIG. 7 is a process flow of generating and/or displaying the relevant content while the media content is streamed to a client device, according to one embodiment. In operation 702, a relevant content that may be targeted toward a user (e.g., the user 110 of FIG. 1) playing a streaming media content may be generated from a central server (e.g., the central server 102 of FIG. 1) based on a characteristic of a media content (e.g., the media content 116 of FIG. 1) currently being streamed and/or a meta-data of the relevant content (e.g., using the streaming module 112 of FIG. 1). In operation 704, the relevant content may be displayed (e.g., using the relevant content module 200 of FIG. 2) while the media content 116 may be streamed to a client device (e.g., the client device 108 of FIG. 1) associated with the user 110. The relevant content may be selected from a user generated content library (e.g., the user generated content library 216 of FIG. 2) and a professional content library (e.g., the professional content library 218 of FIG. 2).

The user generated content library 216 may include a blog content, a karaoke performance, a discussion content, a chat content, and/or an indicator that illustrates which other users may be concurrently listening to the media content 116. The professional content library 218 may include a news content, an event content, a background information content, a lyrics content, and/or a performance content. The meta-data may be an artist name, a track name, an album name, a genre, and/or a theme. An electronic message may be sent to the user 110 (e.g., using the messaging module 208 of FIG. 2) after the media content 116 is streamed (e.g., using the streaming module 112 of FIG. 1) having additional relevant content related to the media content 116. The relevant content may be determined (e.g., using the relevant content module 200 of FIG. 2) based on a profile of the user 110 in a social community environment 100.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the streaming module 112, the communication module 114, the delivery module 120, the matching module 122, the financial module 124, the relevant content module 200, the targeting module 202, the bidding module 204, the widget module 206, the messaging module 208, the transaction module 210, the portion module 212, of FIG. 1-7 may be enabled using software and/or using transistors, logic gates, and electrical circuits (e.g., application specific integrated ASIC circuitry) such as a streaming circuit, a matching circuit, a financial circuit, a delivery circuit, a communication circuit, a streaming circuit, an relevant content circuit, a targeting circuit, a bidding circuit, a widget circuit, a messaging circuit, a transaction circuit, a portion circuit, and other circuits.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method executed by a central server communicatively coupled to a content database that maintains media content items and associated metadata, a relevant content database that maintains a user-generated content library of content items and associated metadata and a professional content library of content items and associated metadata, the central server being communicatively coupled to a social community environment by a network, the method comprising:
   receiving a selection of a media content item from the content database of the central server based on a request of a user device through the social community environment, the media content item having associated metadata;
   automatically selecting a relevant content item from the relevant content database, the relevant content item having associated metadata, the relevant content item being automatically selected based on a match between the metadata associated with the media content item and the metadata associated with the relevant content item;
   streaming the media content item from the content database of the central server, without requiring consideration of the user to access the media content item, to the user device connected to the social community environment, wherein the media content item includes at least one of audio content or video content; and
   providing the relevant content item to the user device associated with the user for display while the media content item is being streamed to the user device.

2. The method of claim 1, wherein the user generated content library includes at least one of the blog content, the performances or events content, the content containing discussions by the other users, and the content containing listening activity of the other users; wherein the content containing discussions by the other users includes a discussion content and a chat content, the content containing listening activity of the other users includes an indicator that illustrates which other users are concurrently listening to the media content, and the performances or events content includes a karaoke performance.

3. The method of claim 1, wherein the meta data associated with the media content item is at least one of an artist name, a track name, an album name, a genre, and a theme.

4. The method of claim 1, wherein an electronic message is sent to the user after the media content item is streamed, the electronic message having an additional relevant content item related to the media content item of the central server, and the additional relevant content item being automatically selected based on a profile of the user in the social community environment.

5. The method of claim 1, wherein the relevant content item is displayed in a dropdown banner adjacent to a location in the social community environment in which the user selected the media content item.

6. The method of claim 1, further comprising:
providing a server-side media player associated with the social community environment that enables the user to stream the media content item along with the relevant content item to the user device; and
providing a widget of the server-side media player that is embeddable across different websites such that users of the different websites are able to stream the media content item along with the relevant content item to their respective user devices from the central server through the different websites.

7. The method of claim 1, further comprising:
processing a transaction in which the user purchases a downloadable copy of the media content item; and
communicating the downloadable copy of the media content item to the user device when the transaction is complete.

8. The method of claim 1, further comprising:
selecting a different relevant content item to be displayed after the relevant content item when the media content item is still being streamed to the user device such that the different ones of the relevant content items are targeted toward at least one of a beginning portion, an middle portion, an ending portion, and an arbitrary portion of the streaming of the media content item.

9. The method of claim 1 in a form of a machine-readable medium embodying a set of instructions that, when executed by a machine, causes the machine to perform the method of claim 1.

10. A system, comprising:
a central server to stream a media content item to a user device connected to a social community environment and to automatically select, from a relevant content database, a relevant content item related to the media content item, the selection based on a match between metadata associated with the media content item and metadata associated with the relevant content item, the relevant content item to be simultaneously displayed with the media content item being streamed;
a media content database associated with the central server having the media content item and the associated metadata and being selected based on a request of the user;
the relevant content database associated with the central server and having a user generated content library and a professional content library, the user generated content library and the professional content library having relevant content items and associated metadata; and
the user device to display the relevant content item related to the media content item while the media content item is being streamed to the user without requiring consideration from the user to access the media content item.

11. The system of claim 10, wherein the user generated content library includes at least one of the blog content, the performances or events content, the content containing discussions by the other users, and the content containing listening activity of the other users; wherein the content containing discussions by the other users includes a discussion content and a chat content, the content containing listening activity of the other users includes an indicator that illustrates which other users are concurrently listening to the media content, and the performances or events content includes a karaoke performance.

12. The system of claim 10, further comprising a communication module of the central server to transmit an electronic message to the user after the media content item is streamed, the electronic message having an additional relevant content item related to the media content item of the central server, wherein the additional relevant content item is automatically selected based on a profile of the user in the social community environment.

13. At least one non-transitory computer readable medium comprising computer-executable instructions stored thereon that when executed by a processor of a central server communicatively coupled to a content database that maintains media content items and associated metadata, a relevant content database that maintains a user-generated content library of relevant content items and associated metadata, a professional content library of relevant content items and associated metadata, and to a social community environment by a network, causes the central server to:
receive a selection of a media content item from the content database of the central server, the request being received from a user device through the social community environment;
stream the media content item from the central server without requiring consideration of the user to access the media content item, wherein the media content item includes at least one of streaming audio content or streaming video content;
automatically selecting a relevant content item related to the media content item, the relevant content item being automatically selected from the relevant content database based on a match between the meta data associated with the media content item and the metadata associated with relevant content item; and
provide to the user device, the relevant content item while the media content item is being streamed to the user device.

14. The at least one non-transitory computer readable medium of claim 13, wherein the user generated content library includes at least one of the blog content, the performances or events content, the content containing discussions by the other users, and the content containing listening activity of the other users; wherein the content containing discussions by the other users includes a discussion content and a chat content, the content containing listening activity of the other users includes an indicator that illustrates which other users are concurrently listening to the media content, and the performances or events content includes a karaoke performance.

15. The at least one non-transitory computer readable medium of claim 13, wherein the meta data associated with the media content item is at least one of an artist name, a track name, an album name, a genre, and a theme.

16. The at least one non-transitory computer readable medium of claim 13, further comprising:
instruction to select a different relevant content item after displaying the relevant content item and while the media content item is still being streamed to the client device such that the different ones of the relevant content item are targeted toward at least one of a beginning portion, an middle portion, an ending portion, and an arbitrary portion of the streaming of the media content item.

17. The at least one non-transitory computer readable medium of claim 13, wherein an electronic message is sent to the user after the media content item is streamed, the electronic message having additional relevant content item related to the media content item of the central server, and the additional relevant content item being automatically selected based on a profile of the user in the social community environment.

18. The at least one non-transitory computer readable medium of claim 13, wherein the relevant content item is displayed in a dropdown banner adjacent to a location in the social community environment in which the user selected the media content item.

19. A method executed by a central server communicatively coupled to a content database that maintains media content items and associated metadata, a relevant content database that maintains a user-generated content library of content items and associated metadata and a professional content library of content items and associated metadata, the central server being communicatively coupled to a social community environment by a network, the method comprising:
- receiving a selection of a media content item from the content database of the central server based on a request of a user device through the social community environment, the media content item having associated metadata;
- automatically selecting a relevant content item from either the user-generated content library or the professional content library of the relevant content database, the relevant content item having associated metadata, the relevant content item being automatically selected based on a match between the metadata associated with the media content item and the metadata associated with the relevant content item;
- streaming the media content item from the content database of the central server to the user device connected to the social community environment, wherein the media content item includes at least one of audio content or video content; and
- providing the relevant content item to the user device associated with the user for display while the media content item is being streamed to the user device.

20. The method of claim 19 wherein the professional content library includes news content, event content, background information content, lyrics content, or performance content.

21. The method of claim 19 wherein the user-generated content library includes blog content, a karaoke performance, discussion content, chat content, or concurrent listening content.

22. The method of claim 19, wherein the metadata associated with the media content item is at least one of an artist name, a track name, an album name, a genre, and a theme.

23. The method of claim 19, wherein an electronic message is sent to the user after the media content item is streamed, the electronic message having an additional relevant content item related to the media content item of the central server, and the additional relevant content item being automatically selected based on a profile of the user in the social community environment.

24. The method of claim 19, wherein the user generated content library includes at least one of the blog content, the performances or events content, the content containing discussions by the other users, and the content containing listening activity of the other users; wherein the content containing discussions by the other users includes a discussion content and a chat content, the content containing listening activity of the other users includes an indicator that illustrates which other users are concurrently listening to the media content, and the performances or events content includes a karaoke performance.

25. The method of claim 19, wherein the relevant content item is displayed in a dropdown banner adjacent to a location in the social community environment in which the user selected the media content item.

26. The method of claim 19, further comprising:
- providing a server-side media player associated with the social community environment that enables the user to stream the media content item along with the relevant content item to the user device; and
- providing a widget of the server-side media player that is embeddable across different websites such that users of the different websites are able to stream the media content item along with the relevant content item to their respective user devices from the central server through the different websites.

27. The method of claim 19, further comprising:
- processing a transaction in which the user purchases a downloadable copy of the media content item; and
- communicating the downloadable copy of the media content item to the user device when the transaction is complete.

28. The method of claim 19, further comprising:
- selecting a different relevant content item to be displayed after the relevant content item when the media content item is still being streamed to the user device such that the different ones of the relevant content items are targeted toward at least one of a beginning portion, an middle portion, an ending portion, and an arbitrary portion of the streaming of the media content item.

* * * * *